(12) United States Patent
Melton

(10) Patent No.: US 11,695,860 B2
(45) Date of Patent: Jul. 4, 2023

(54) ONLINE APPLICATION LAYER PROCESSING OF NETWORK LAYER TIMESTAMPS

(71) Applicant: REFINITIV US ORGANIZATION LLC, New York, NY (US)

(72) Inventor: Hayden Melton, Philadelphia, PA (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 120 days.

(21) Appl. No.: 17/344,757

(22) Filed: Jun. 10, 2021

(65) Prior Publication Data

US 2021/0400125 A1    Dec. 23, 2021

Related U.S. Application Data

(60) Provisional application No. 63/040,884, filed on Jun. 18, 2020.

(51) Int. Cl.
| | |
|---|---|
| *G06F 15/173* | (2006.01) |
| *H04L 69/321* | (2022.01) |
| *H04L 9/32* | (2006.01) |
| *H04L 69/22* | (2022.01) |

(52) U.S. Cl.
CPC .......... *H04L 69/321* (2013.01); *H04L 9/3236* (2013.01); *H04L 9/3297* (2013.01); *H04L 69/22* (2013.01)

(58) Field of Classification Search
CPC ... H04L 69/321; H04L 9/3236; H04L 9/3297; H04L 69/22
USPC .................................................. 709/223–225
See application file for complete search history.

(56) References Cited

U.S. PATENT DOCUMENTS

| | | |
|---|---|---|
| 9,450,846 B1 | 9/2016 | Huang |
| 9,787,559 B1* | 10/2017 | Schroeder ............... H04L 43/55 |
| 10,326,803 B1 | 6/2019 | Haney |
| 10,917,229 B2 | 2/2021 | Geng et al. |
| 10,979,207 B1 | 4/2021 | Geng et al. |
| 2020/0034929 A1 | 1/2020 | Rao et al. |
| 2020/0059310 A1 | 2/2020 | Garrett |
| 2020/0177660 A1* | 6/2020 | Connor .................. H04L 69/326 |
| 2020/0186465 A1* | 6/2020 | Dontula Venkata .... H04L 49/25 |
| 2020/0235938 A1* | 7/2020 | Snowdon .............. H04L 9/3242 |

(Continued)

OTHER PUBLICATIONS

Anonymous: "Wireshark—Wikipedia", May 27, 2020, 6 pages. Retrieved from the Internet on Aug. 6, 2021. <https://en.wikipedia.org./w/index.php?title=Wireshark&oldid=959156288>.

(Continued)

*Primary Examiner* — Duyen M Doan
(74) *Attorney, Agent, or Firm* — Pillsbury Winthrop Shaw Pittman LLP

(57) ABSTRACT

Computer-readable media, systems and methods may propagate lower layer data, in headers that would otherwise be deleted, to upper layers in a network protocol stack that uses a multi-layer communication model. For example, high precision network-level timestamps that indicate a time that binary data is received at a network switch may be propagated upward for online application-level processing. Network switches may ordinarily insert network-level timestamps in frame headers that are ordinarily removed prior to propagation upward. The network-level timestamps may be propagated via in-band propagation or out-of-band propagation.

20 Claims, 11 Drawing Sheets

(56) References Cited

U.S. PATENT DOCUMENTS

2021/0119968 A1* 4/2021 Schibuk .................... H04L 9/14
2021/0218651 A1* 7/2021 Rangarajan ........... H04L 43/026

OTHER PUBLICATIONS

International Search Authority, "The search report and written opinion, PCT Application No. PCT/IB2021/055087, dated Aug. 16, 2021", 20 pages.
Andreas Schmidt, Dissertation "Cross-layer Latency-Aware and Predictable Data Communication", Saarbrucken, 2019, 169 pages.
Joe Damato, "Monitoring and Tuning the Linux Networking Stack: Receiving Data", Jun. 22, 2016, 119 pages.
Arista Solution Brief, "An Overview of Arista Ethernet Capture Timestamp", arista.com, downloaded from the internet on May 21, 2021, 7 pages.
R. Bush et al., "Some Internet Architectural Guidelines and Philosophy", Dec. 2002, 28 pages.
Subodh Sazena, "A Guide to Using Raw Sockets", Mar. 21, 2015, 12 pages.
Matteo Aquilina et al., "Quantifying the High-Frequency Trading "Arms Race": A Simple New Methodology and Estimates", Occasional Paper 50, Jan. 2020, 67 pages.
Richard M. Karp, "On-Line Algorithms Versus Off-Line Algorithms: How Much is it Worth to Know the Future?", Jul. 1992, 13 pages.
Theodore G. Handel et al., "Hiding Data in the OSI Network Model", International Workshop on Information Hiding IH 1996: Information Hiding pp. 23-38.
International Preliminary Report on Patentability issued in the corresponding International Application No. PCT/IB2021/055087 dated Dec. 29, 2022.

* cited by examiner

US 11,695,860 B2

ONLINE APPLICATION LAYER PROCESSING OF NETWORK LAYER TIMESTAMPS

RELATED APPLICATIONS

This application claims priority to U.S. Provisional Patent Application No. 63/040,884, filed on Jun. 18, 2020, the content of which is incorporated by reference in its entirety herein.

BACKGROUND

In computer science, there is a distinction between so-called online and offline algorithms. Online algorithms process data immediately as they receive it with no ability to look into the future, whereas offline algorithms are given an entire dataset so that analysis of any point in that dataset may be performed with knowledge of future data that occurred after that point. An example of online processing is real-time processing of data transmitted over computer networks, which may implement a multi-layered framework for data transmission.

For example, the Open Systems Interconnection (OSI) model for computer networking describes multiple layers through which data is propagated from a sender device to a recipient device. The OSI model specifies what is known as strict layering, where a given layer in the model may only communicate with the layer directly beneath it. A consequence of this is that information that appears in the headers of transmission units of lower-level layers (hereinafter referred to as "lower layers" or individually as a "lower layer") (whether those transmission units are frames, packets, segments, datagrams, and so forth depending on the layer) is not propagated 'upwards' to higher-level layers (hereinafter referred to as "higher layers" or individually as a "higher layer") such as the application-layer and is instead discarded by its layer after the information in it has been used. For example, a given layer may use data from a header to sequence the transmission units or determine its sender, and then discard the header. Thus, a problem may arise for online processing in the OSI model, or other multi-layer communication models for computer networking, in which higher layers are unable to access information from lower layer headers. These and other issues may exist with modern operating systems and computer networks that implement multi-layer communication models.

SUMMARY

The disclosure relates to systems, methods, and computer-readable media of propagating lower layer data, in headers that would otherwise be deleted, to upper layers in a network protocol stack that uses a multi-layer communication model. A system may propagate lower layer header data upward via in-band propagation or out-of-band propagation. Such propagation may continue through various layers so that a layer may access lower-layer data that would not otherwise be accessible. For illustrative purposes, examples of lower layer data that is propagated upward will include network-layer timestamps in headers written by network switches. However, other examples of lower layer data may be propagated upward as well, or instead. Such other examples may include, without limitation, a flag in a header to indicate that the frame/message/datagram was a possible duplicate or retransmission (such as when the initial transmission was dropped, failed, got corrupted, or otherwise required retransmission). Another example may include a quality of service (QoS) value. For example, in some scenarios, the switch can be configured to prioritize messages with high QoS headers over low QoS headers but if the switch is not configured to do this, then those QoS headers can be used for other reasons, such as to convey application-level information.

An application layer device operating at an application layer may access high precision network-layer timestamps that are generated by a network switch to indicate a time at which binary data (bits or bytes) are received over a physical link at the network switch. The network-layer timestamps are referred to as "high precision" because they indicate a time at which data is received at a host system in a more precise manner than timestamps of other layers. For example, an application-layer timestamp indicating when data is received at the application layer may be a less precise indicator of when the data is received at the host system because of the time it takes for data to traverse from the network switch to the device operating at the application layer. These network-layer timestamps may otherwise not be accessible to the application because they are normally deleted as data is propagated upward.

The application layer device may use the network-layer timestamps to determine an order in which data is received at the network switch. As such, precise times at which incoming data is received at a host system or other lower layer network data that is not otherwise propagated may be obtained at an application layer of a network protocol stack.

BRIEF DESCRIPTION OF THE DRAWINGS

Features of the present disclosure may be illustrated by way of example and not limited in the following Figure(s), in which like numerals indicate like elements, in which.

DETAILED DESCRIPTION

Figure 1:
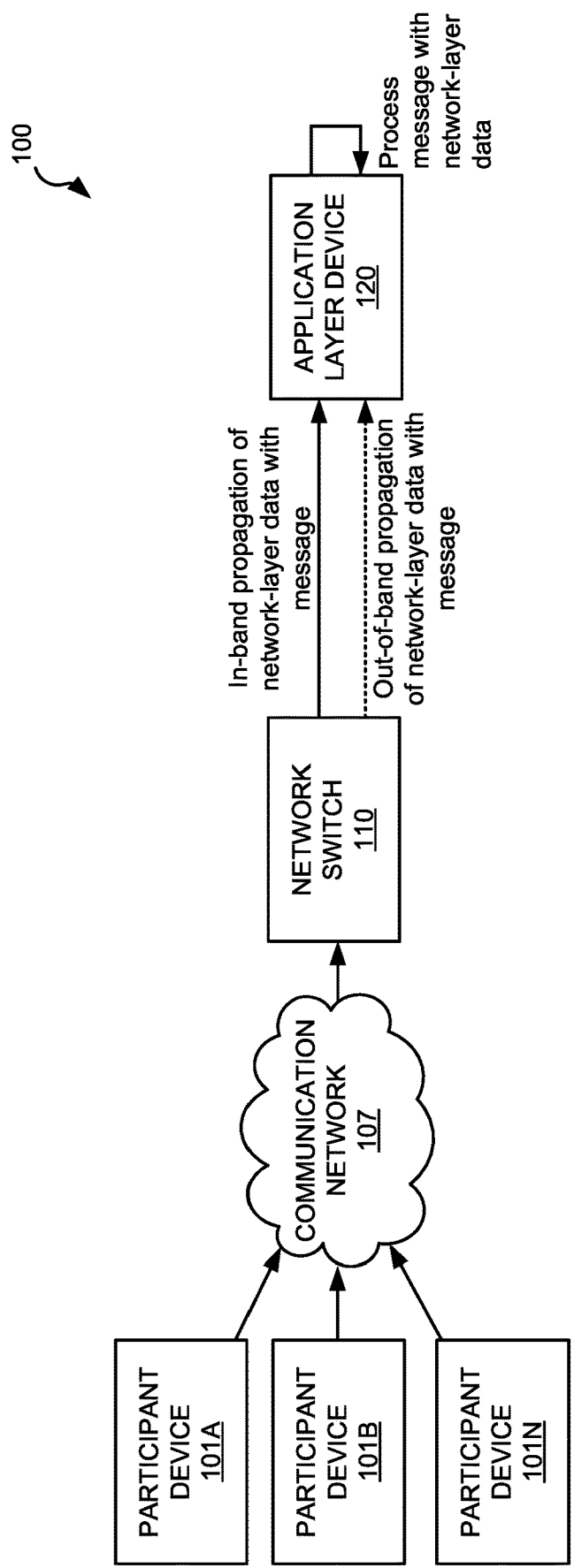
FIG. 1 illustrates an example of a system of propagating lower layer data such as network-layer timestamps to upper layers in a network protocol stack that uses a multi-layer communication model.

FIG. 1 illustrates an example of a system environment 100 of propagating network layer data such as timestamps to upper layers in a network protocol stack that uses a multi-layer communication model. The multi-layer communication model may refer to a framework in which data is propagated through successive layers that each have a role in transporting data from a sender to a recipient. Each layer may be implemented by a device of a network protocol stack. Examples of a multi-layer communication model may include the OSI model, Transmission Control Protocol/Internet Protocol (TCP/IP) framework, and/or other data communication techniques that use different layers for data propagation.

The term "network layer data" (and more specifically "network layer timestamps") as used herein will refer to data that is not ordinarily (other than for this disclosure) operated on by an application. For example, in the OSI model, network layer data may include data generated and used at a physical layer, a datalink layer, a network layer, and, in some cases, the transport layer. In the TCP/IP framework, network layer data may include data generated and used at a network access layer, an internet layer, and, in some cases, the transport layer.

System environment 100 may include a plurality of participant devices 101 (illustrated as participant devices 101A-N), a network switch 110, and an application layer device 120. A participant device 101 may transmit a message destined for the application layer device 120 via a communication network 107. The message may be formatted for transmission during a process called encapsulation, in which headers are successively added at each layer for aiding processing at that layer. Encapsulation may continue through multiple layers, where each layer has a specific processing role to encode data from an upper layer to a lower layer. The message from the participant device 101 is encapsulated for transport as binary data (bits/bytes) over a physical link of the communication network 107.

The network switch 110 may receive the bits from the physical link and propagate, during decapsulation, the binary data up the various layers of the multi-layer communication model to the application layer device 120, which may perform online processing of the message. During decapsulation, lower layer headers are removed in connection with transport through upper layers until the message is assembled for consumption by the application layer device 120. Any responses from the application layer device 120 may be encapsulated for transmission back to the participant device 101.

Figure 2A:
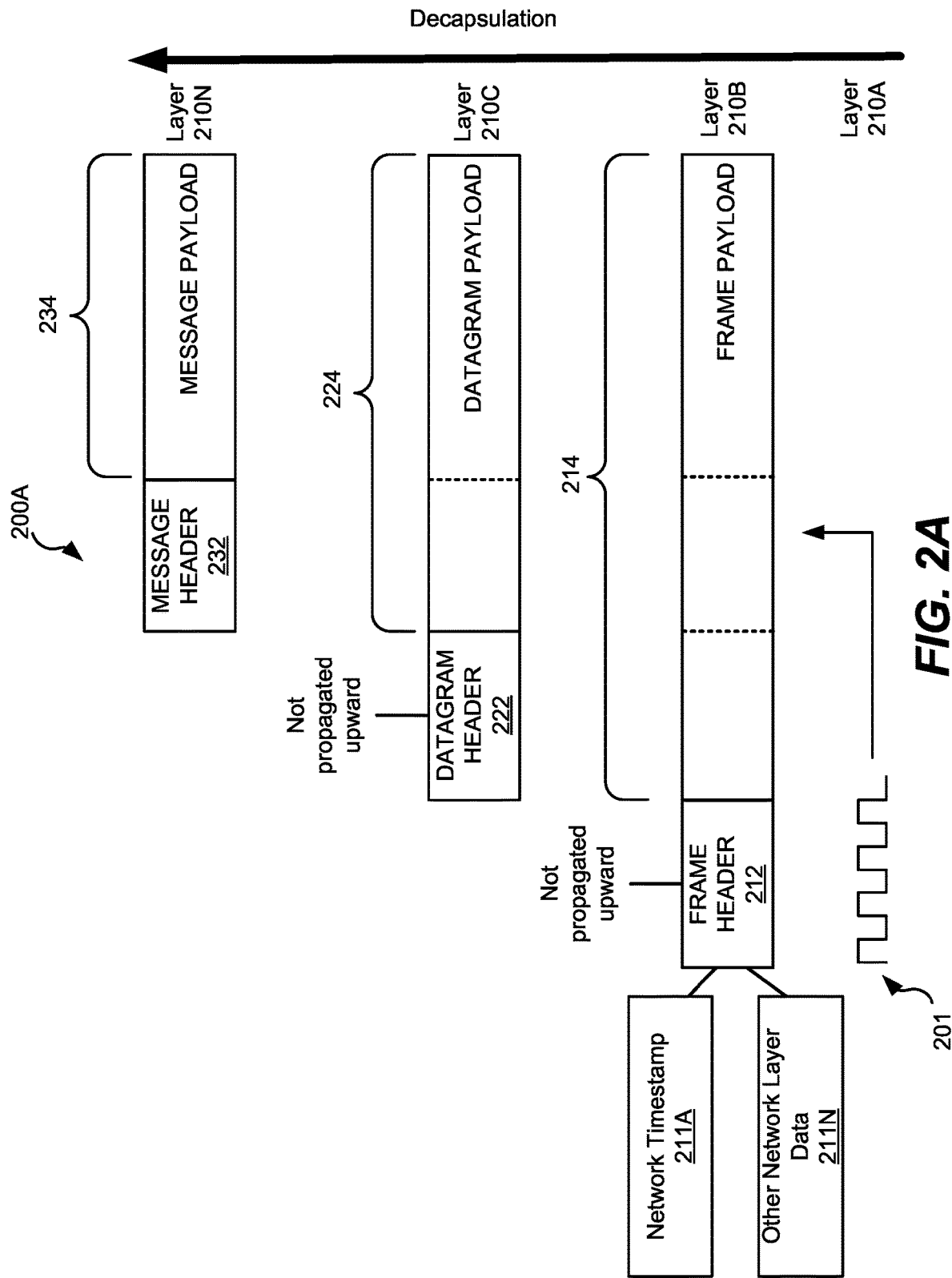
FIG. 2A illustrates an example of the loss of lower layer data when data is propagated to upper layers.

An issue that may arise during decapsulation is that data in lower layer headers are not retained as the message is propagated to upper layers. For example, FIG. 2A illustrates an example of the loss of lower layer data when data is propagated to upper layers. FIG. 2A shows only four layers (210A, 210B, 210C, and 210N) for clear explanation. It should be noted that other numbers of layers may be used. For example, the OSI model includes seven layers and the TCP/IP framework includes five layers.

It should be further noted that a message from a higher layer may not fit into the payload of a lower layer and therefore may span the payloads of more than one lower layer message. Furthermore, the start of a higher layer message is not necessarily aligned to the 'start' of the payload of a lower layer message. For example, the start of the frame payload 214 from the beginning of the frame (which includes the frame header 212 and the frame payload 214) may be different than the start of the datagram payload 224 from the beginning of the datagram (which includes the datagram header 222 and the datagram payload 224). Such differences in starting position, or offset, may be a result of differences in header sizes at different layers and/or whether or not a message is broken up into multiple payloads of another layer. As data is propagated upward, each layer may re-sequence the data for that layer and, if necessary, join together messages that span multiple lower layer payloads and so on.

Layer 210A may be a physical layer that includes a physical link through which the binary data 201 is transmitted. The physical link may include a medium such as a network cable or other physical medium of the communication network 107 that is able to carry binary data. The binary data 201 may encode a message sent by a participant device 101 intended for an application layer device 120. It should be noted that such binary data 201 may have been encoded via encapsulation for transport over the physical link to the application layer device 120.

At layer 210B, the network switch 110 may receive the binary data 201 (bits or bytes) from layer 210A. At layer 210B, the binary data may be organized into one or more frames having a frame payload 214. The network switch 110 may generate and insert network layer data 211 into a frame header 212.

In a particular example, an ethernet frame received from the physical link may be initially populated by the sender of the frame with a timestamp in a frame header. The network switch 110 may generate a new timestamp indicating receipt of the ethernet frame and overwrite the existing timestamp in the frame header with the new timestamp. In any event, the ethernet header is not passed 'upward' to higher layers in the protocol stack. Further, to achieve increased throughput, the device driver for the network interface card may maintain a plurality of independent buffers (such as ring buffers) for ethernet frames it receives. The effect of this is that higher layers cannot recover or observe the ordering in which data was received by the network card (serialization of data over a network imposes a total ordering on bytes received by a network interface card, and this information is 'lost' due to the existence of those multiple independent ring buffers).

The network layer data 211 may be used at the layer 210B, such as by the network switch 110. For example, the network layer data 211 may include a network timestamp 211A that indicates a time at which the binary data 201 was received from the physical layer. In some examples, the network timestamp 211A may ordinarily be used to monitor network traffic at the network switch 110.

The layer 210B may propagate the frame payload 214 to layer 210C. The frame header 212 may not be propagated upward during decapsulation, thereby losing the network timestamp 211A and/or other network layer data 211N data encoded therein. The layer 210C may receive the frame payload 214. The frame payload 214 may include a datagram header 222 and a datagram payload 224. The datagram header 222 may indicate its size (in bits or bytes) and therefore where the datagram payload 224 starts in the frame payload 214 propagated from the layer 210B. The layer 210C may read the datagram header 222, extract the datagram payload 224 and propagate the datagram payload 224 upward to layer 210N. Again, as was the case with the layer 210B, the layer 210C does not propagate the datagram header 222 upward.

The layer 210N may receive the datagram payload 224 from the layer 210C. The datagram payload 224 may include a message header 232 and a message payload 234. The message header 232 may indicate its size (in bits or bytes) and therefore where the message payload 234 starts in the datagram payload 224 propagated from the layer 210C. As illustrated, the layer 210N may represent the last layer, or application layer, where the message sent from the participant device 101 is consumed. The layer 210 may read the message header 232 and extract the message payload 234 based on the size of the message header 232. As illustrated, because of the process of decapsulation in multi-layer communication models, the layer 210N does not have access to the data contained in the frame header 212 and the datagram header 222. Likewise, the layer 210C does not have access to the data contained in the frame header 212.

Figure 2B:
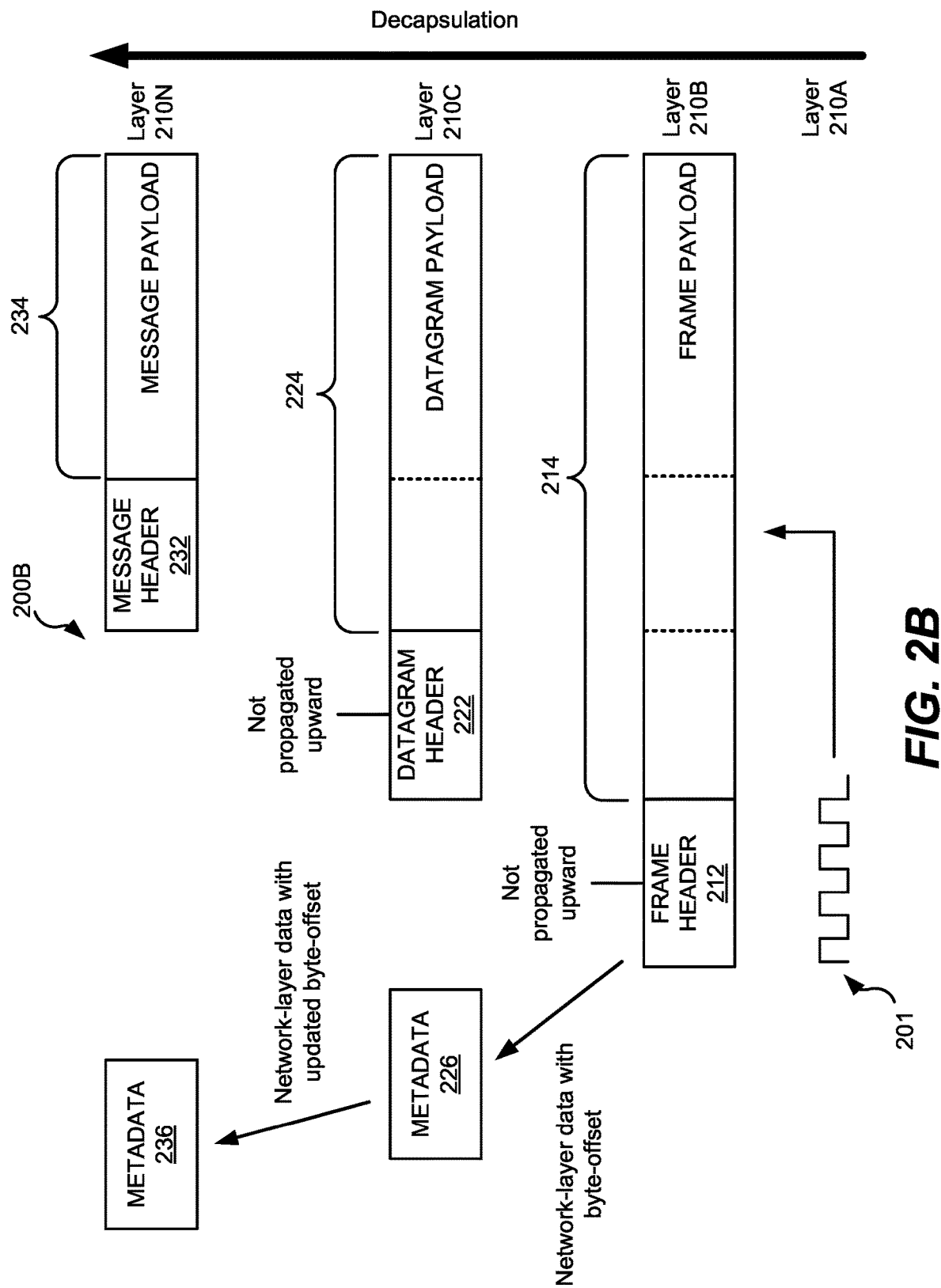
FIG. 2B illustrates an example of the propagation of lower layer data that would otherwise be lost when data is propagated to upper layers.

FIG. 2B illustrates an example of the propagation of lower layer data that would otherwise be lost when data is propagated to upper layers. Payloads may be propagated upward as illustrated in FIG. 2A. In addition, as a separate data structure, additional information is passed upward as metadata as the payloads are extracted from lower-layer messages so as to reconstruct higher-layer messages. For example, layer 210B may propagate metadata 226 upward. The metadata 226 may include the network layer data 211A-N, including network timestamps 211A, and offset(s) to which the network timestamps 211A apply. Likewise, layer 210C may propagate metadata 236 upward. The metadata 236 may include the network layer data 211A-N, including network timestamps 211A, and new offset(s) that are updated for this layer. This process may continue in intervening layers up to layer 210N, where an application layer device may obtain the metadata 236 to determine network layer data associated with a message payload 234. For example, the application layer device may determine a time at which the message payload 234 (in encapsulated form) was received at the network switch 110.

Offset Updates

As an example, imagine there are two distinct messages from layer 2 encapsulated by a single layer 1 (such as layer 210B) message. Both are 50 bytes long. Then the metadata that will be populated for layer 2 (such as layer 210C) data will have two timestamps (both the same, and from the layer 1 message's header) and offsets of 0 and 50 bytes, for the first and second layer 2 messages respectively. Then say those two layer 2 messages together encapsulate a single layer 3 (such as layer 210N) message. The headers of both layer 2 messages are say 8 bytes, then the timestamp in the metadata for layer 3 will have offset of 0 and apply to a total of bytes 50×2−(2×8)=84. The key idea is that as the bytes move 'up' the stack the timestamp in the low-layer header can always unambiguously be associated with bytes in the payloads of all higher-layer messages.

Of course, certain protocols such as TCP/IP are classified as 'reliable' and to achieve that reliability acknowledge to the sender data that the receiver has actually received. In the case of re-transmissions, the scheme described above may be modified such that a plurality of timestamps is associated with the same (or even overlapping byte 'segments') at higher-layers. Alternatively, a decision may be made in the implementation of the scheme to include only the first timestamp associated with a byte segment, or the last timestamp in the case of retransmissions.

Metadata Propagation

As to how the above data is presented to application programmers, many socket API's that deliver data from the network to the application-layer have a blocking method or callback not dissimilar to the following:

void read(String ip_address, int port, byte[ ] buffer, int bytes_read)

In this conventional callback/method there is (unsurprisingly) no parameter to convey the timestamp metadata from FIG. 2. What there is though, are parameters to indicate the IP address from which data was sent to this receiver, the (logical) port on which this data was received, a place to store the bytes received (the 'buffer') and the number of bytes actually written to the byte array buffer that were received.

In some examples, the read method above may be modified as follows:

void read(String ip_address, int port, byte[ ] buffer, int bytes_read, TSMetadata md)

In this modified read method a new parameter 'md' of type TSMetadata has been added. This TSMetadata type may be a struct or class that is defined as follows:

```
class TSMetadata {
    long[ ] network_timestamps;
    int[ ] offsets;
}
```

In the above data type the field network_timestamps may contain the network-layer timestamps inserted by the network switch. The offsets datatype may contain the indexes into the byte array buffer where the timestamp applies. So, if the timestamps are [1,5] using some timestamping scheme, and the offsets are [0,205] then timestamp 1 applies to bytes 0-204 in the buffer array, and timestamp 5 applies to bytes 205 to bytes_read minus one in the buffer byte array. In this way, every byte is associated with a timestamp (and at least one timestamp, depending on how we handle retransmits under a scheme providing reliability) indicating the time at which the network switch or some other device inserted the timestamp into the lower-layer message header.

Figure 3A:
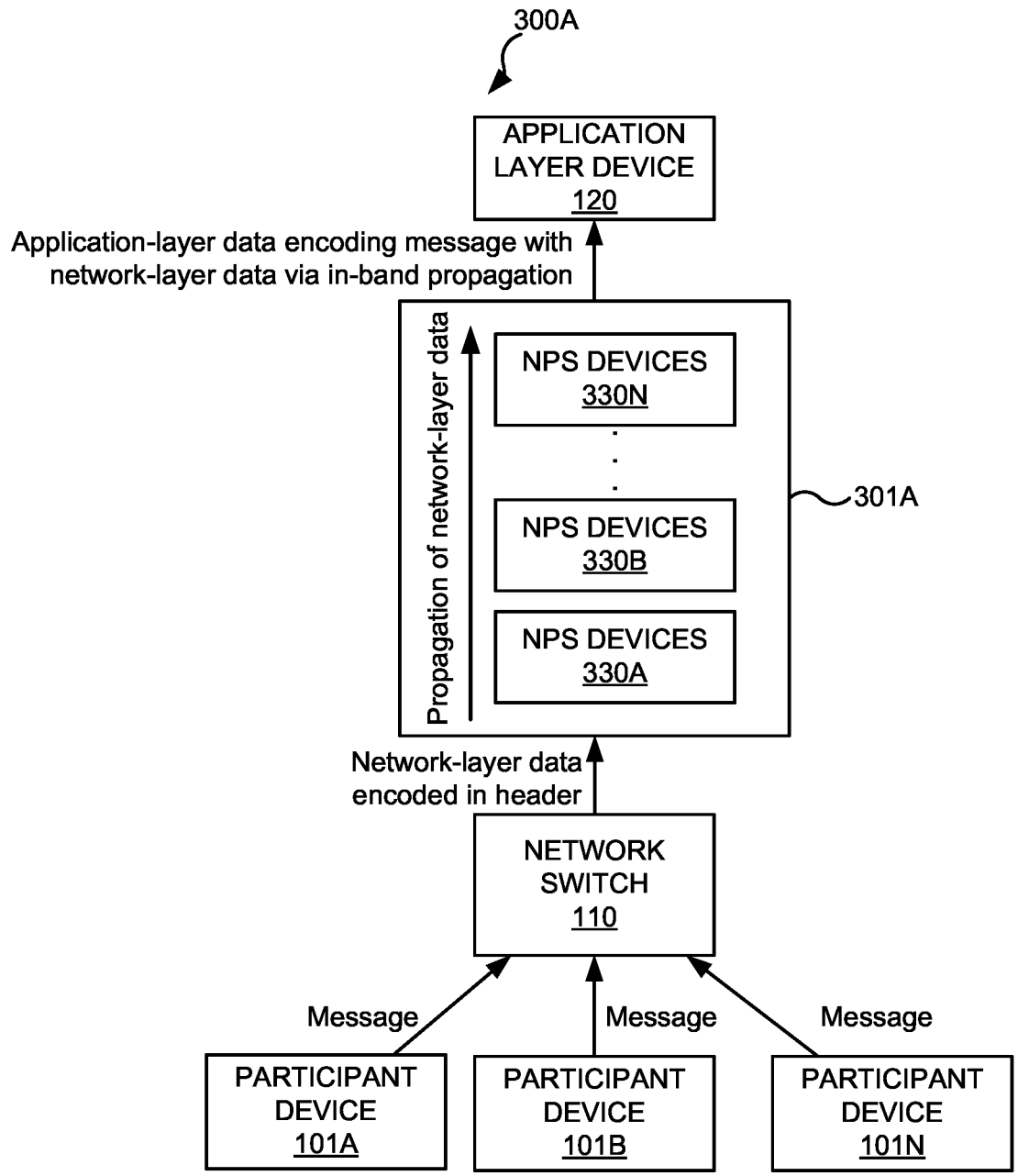
FIG. 3A illustrates an example of in-band propagation of lower layer data to upper layers.
Figure 3B:
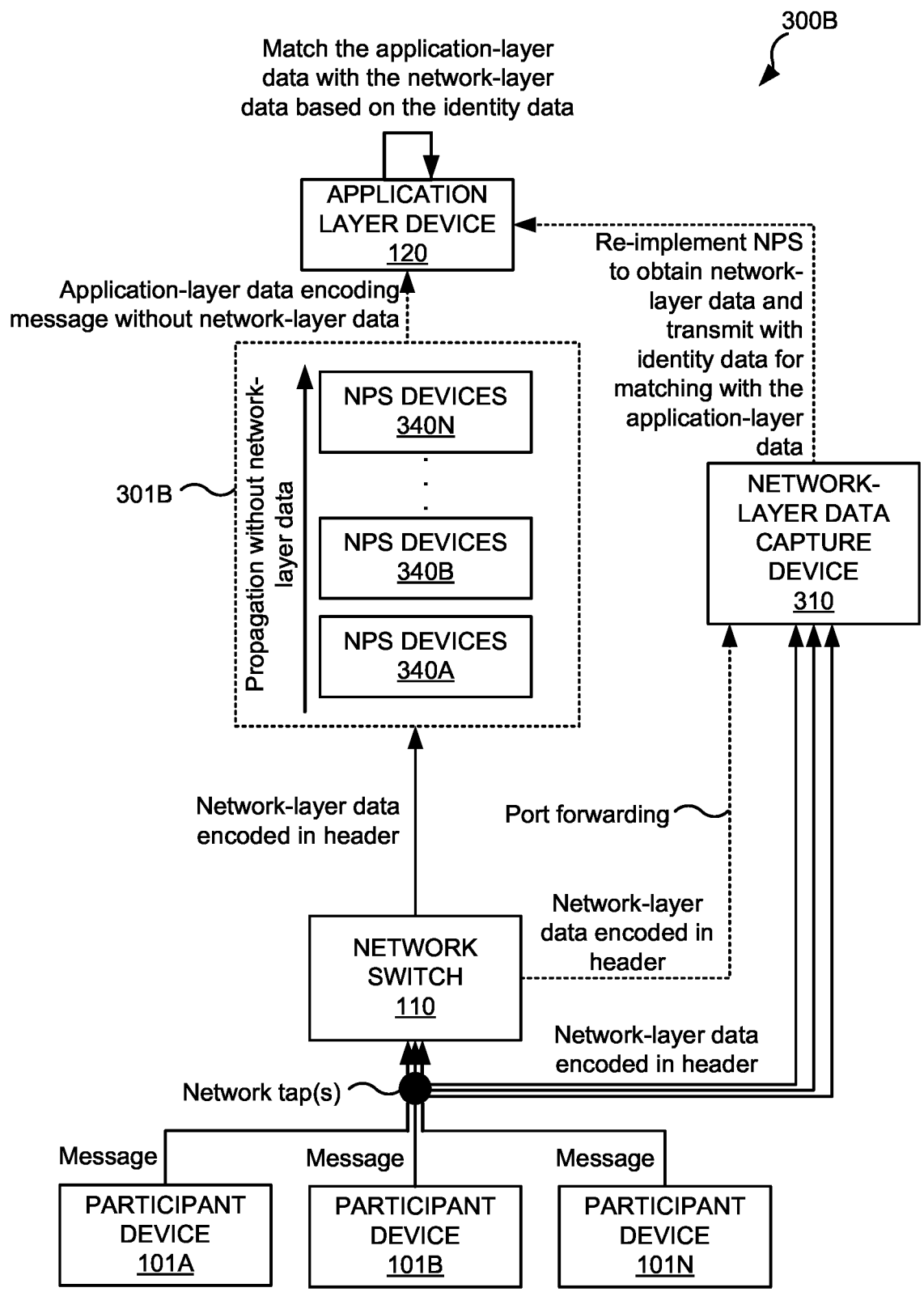
FIG. 3B illustrates an example of out-of-band propagation of lower layer data to upper layers.

The propagation of lower-layer data to upper layers described with respect to FIG. 2B may be implemented through in-band propagation illustrated in FIG. 3A or out-of-band propagation illustrated in FIG. 3B.

For example, FIG. 3A illustrates an example of in-band propagation 300A of lower layer data to upper layers. The propagation of lower layer data, such as network-layer timestamps, to upper layers may be implemented by network protocol stack (NPS) devices 330 (illustrated as NPS devices 330A-N) of an NPS 301A. It should be noted that the application layer device 120 and the network switch 110 are also part of the NPS 301A, but are shown separately. Put another way, the application layer device 120 and the network switch 110 may each be considered an NPS device 330.

NPS devices 330 may each implement one or more layers between the datalink layer and the application layer. For example, the application layer device 120 may implement an application layer of the multi-layer communication model. In some examples, the application layer device 120 may implement a presentation layer. An NPS device 330 may include a router device that implements a network layer, a firewall device that implements a transport layer, a gateway device that implements a session layer. The network switch 110 may implement a datalink layer of the multi-layer communication model.

Each of the NPS devices 330 (except for a top-level application layer device) may be programmed to propagate lower layer data (such via metadata 226 or metadata 236 illustrated in FIG. 2B) to an upper layer. An example process of a given NPS device 330 that implements a layer and propagates lower layer data to an upper layer will be described at FIG. 4.

The in-band propagation 300A of lower layer data to upper layers may involve reprogramming each of the NPS devices 330 to perform such propagation. In some examples, to avoid such reprogramming of each of the NPS devices 330, out-of-band propagation of lower layer data to upper layers may be used instead.

FIG. 3B illustrates an example of out-of-band propagation 300B of lower layer data to upper layers. The NPS devices 340A-N of NPS 301B may be similar to the NPS devices 330A-N in that they may each implement one or more layers of the multi-layer communication model. However, the NPS devices 340A-N are not reprogrammed to perform propagation of lower layer data, but instead may transmit data up the layers in a more conventional sense that loses lower layer data (such as network-layer timestamps). For example, as data is received at the network switch 110, the data may be propagated upward through layers as described with respect to FIG. 2A, in which lower layer data such as network timestamps are lost as data is propagated upward to the application layer device 120. The application layer device 120 may buffer the application-layer data for comparison to data transmitted out-of-band via a network layer data capture device 310. In some examples, the network switch 110 may forward the received data to a network layer data capture device 310 via port forwarding (as illustrated by dashed lines) and/or via a network tap for each physical link to a participant device 101N. Each network tap may duplicate the received data to the network layer data capture device 310. In whichever manner the received data is transmitted to the network layer capture device 310, the network layer data capture device 310 may re-implement the NPS 301B to function as NPS 301A. To re-implement the NPS 301B to function as NPS 301A, the network layer data capture device 310 may emulate protocols used by each NPS device 330A-N illustrated in FIG. 3A. In this way, the actual NPS devices 340A-N used in a host system that receives the data do not need to be reprogrammed. Thus, the network layer data capture device 310 may receive data from the network switch 110 and generate application-layer data by emulating the propagation of data and metadata. Put another way, the network layer data capture device 310 may implement the propagation illustrated in FIG. 2B to generate application-layer data with network layer data or other lower layer data propagated with the application-layer data.

After such propagation, the network layer data capture device 310 may have obtained application-layer data (the same application-layer data received at the application layer device 120 from NPS 301B). Instead of sending the entire application-layer data, to save network bandwidth, the network layer data capture device 310 may generate identifying data for application-layer data. For example, the network layer data capture device 310 may use a cryptographic hash function to generate an output hash based on the application-layer data. The output hash may be a deterministic output in that given identical inputs, a unique hash output may be generated. Thus, different inputs may result in different hash outputs. Examples of cryptographic hash functions includes those from the Secure Hash Algorithm 2 (SHA-2) family of functions, although other cryptographic hashing functions that generate deterministic outputs may be used. The network layer data capture device 310 may transmit the identifying information (such as the hash output) and the lower layer data (such as a network timestamp) that was lost during decapsulation by NPS 301B to the application layer device 120.

The application layer device 120 may have buffered the application-layer data from the NPS 301B and may generate its own hash of the buffered application-layer data from the NPS 301B using the same cryptographic hash function used by the network layer data capture device 310. For example, both the application layer device 120 and the network layer data capture device 310 may be pre-programmed to use the same cryptographic hash function. In some examples, the network layer data capture device 310 may transmit an identity of the cryptographic hash function to the application layer device 120. In any event, the application layer device 120 may match its hash with the hash received from the network layer data capture device 310. Upon determining a match, the application layer device 120 may determine that the buffered application-layer data is associated with the lower layer data received from the network layer data capture device 310. Using the out-of-band propagation 300B, lower layer data may be propagated upward without reprogramming the NPS devices 340 of NPS 301B.

Figure 4:
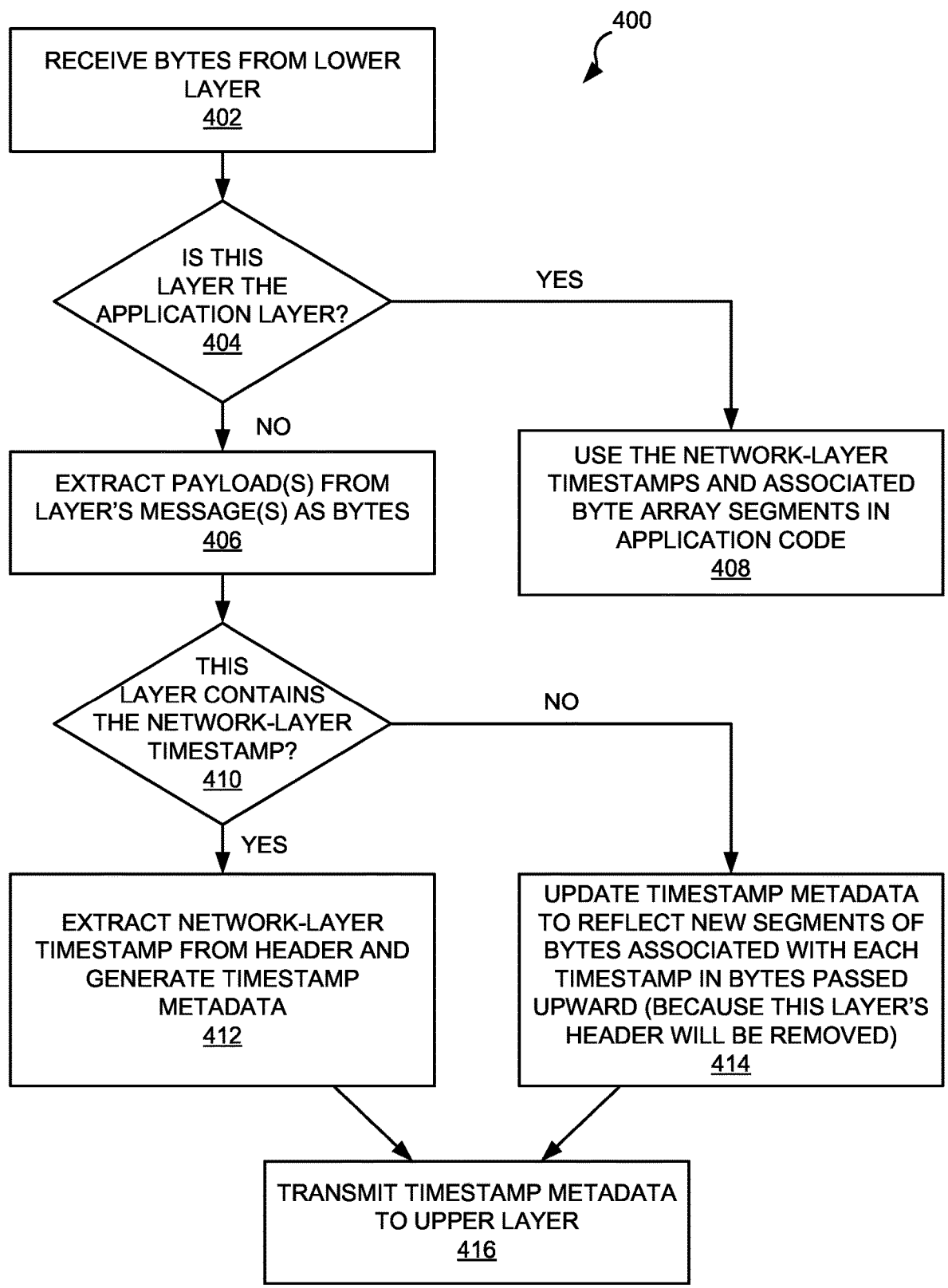
FIG. 4 illustrates an example of a method, at a layer of the multi-layer communication model, of propagating lower layer data such as network timestamps to an upper layer.

FIG. 4 illustrates an example of a method 400, at a layer of the multi-layer communication model, of propagating lower layer data such as network timestamps to an upper layer. The method 400 may be performed by one or more of the NPS devices 330A-N and/or the network layer data capture device 310.

At 402, the method 400 may include receiving bytes from a lower layer. At 404, the method 400 may include determining whether this layer is the application layer. Devices not executing applications in the application layer may proceed to 406, while devices executing applications in the application layer may proceed to 408, in which a device may use the network timestamps and associated byte array segments in the application.

At 406, the method 400 may include extracting payload(s) from the layer's message(s) as bytes. At 410, the method 400 may include determining whether this layer includes the network-layer timestamp or other network layer data. Devices implementing the layer that includes the network-layer timestamp (such as the network switch 110) may, at 412, extract the network-layer timestamp or other network layer data from the header (such as from frame header 212 illustrated in FIG. 2A) and generate metadata (such as metadata 226 illustrated in FIG. 2A). It should be noted that, at 412, the network switch 110 may generate the network timestamp to indicate a time at which the binary data (bits/bytes) was received at the network switch 110. Devices not implementing the layer that includes the network-layer timestamp may update the timestamp metadata to reflect new segments of bytes associated with each timestamp in bytes passed upward. For example, the offset may be updated as described with reference to FIG. 2B. At 416, the method 400 may include transmitting the timestamp metadata to an upper layer.

Figure 5:
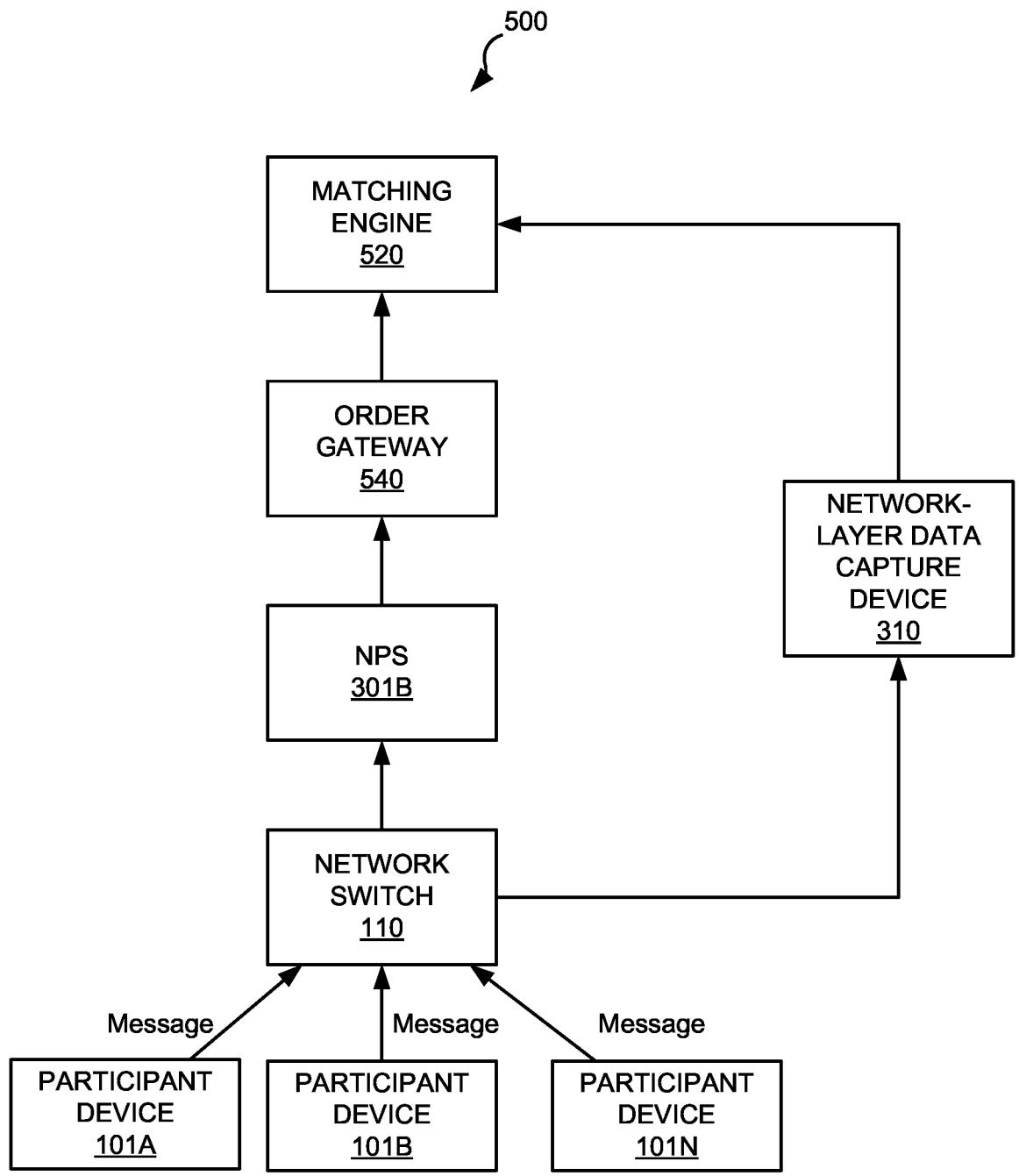
FIG. 5 illustrates a schematic flow diagram of out-of-band propagation of network layer timestamps via a network layer capture device in an electronic trading venue that uses a matching engine to identify the order in which electronic messages encoding orders are received at a network switch.

The propagation of lower layer data that would not otherwise be provided to upper layers may be used in various contexts. For example, FIG. 5 illustrates a schematic flow diagram 500 of out-of-band propagation of network layer timestamps via a network layer data capture device 310 in an electronic trading venue that uses a matching engine 520 to identify the order in which electronic messages encoding orders are received at the network switch 110. An example of an electronic trading venue is described in U.S. patent application Ser. No. 16/041,966, filed on Jul. 23, 2018, entitled "Delay-free matching for deemphasizing effects of speed differentials among price-makers," the content of which is incorporated by reference in its entirety herein. An example of using high-precision network timestamps to determine the time of arrival of FIX messages may be used in the context of determining an ideal latency floor, an example of which is described in U.S. Pat. No. 10,325,317, issued on Jun. 19, 2019, entitled, "Ideal latency floor." In this use-case, the system disclosed therein may use the timestamps to determine whether an order should go into a batch, and when that batch ought to have started rather than when, say, the message was actually received by the application-layer matching engine component.

Referring to FIG. 5, inbound messages (such as order messages sent using the FIX protocol) to the electronic trading venue are received by the network switch 110 and decapsulated via the NPS 301B to the order gateway 540. The order gateway 540 may forward the inbound messages to the matching engine 520. Simultaneously, the network layer data capture device 310 may receive the inbound network traffic that the order gateway 540 receives.

The network layer data capture device 310 may implement a packet capture library supported by an operating system. On receipt of this network traffic, network layer data capture device 310 may use propagation techniques illustrated in FIGS. 2B, 3B, and 4 and associates the network level timestamp or other lower layer data ordinarily lost during decapsulation with the application-level FIX order messages. As each message is associated with such a timestamp, the message and associated timestamp is sent from the network layer data capture device 310 such as via a TCP/IP socket to the matching engine 520. Since there is no guarantee the message from this program will reach the matching engine 520 at the same time as the same (but non-timestamped) messages from the order gateway 540, the matching engine 520 may buffer both sets of messages so as to accumulate and ultimately reconcile the two sources of messages in such a way to associate the network-level timestamp with the application-level order message.

To improve efficiency, the network layer data capture device 310 may not send the actual order message to the matching engine 520. Instead, the network layer data capture device 310 may send the pair of (i) a substantially unique identifier computed from the order message and (ii) the network-level timestamp. The substantially unique identifier may be a hash output using a cryptographic hash function on one or more fields of the order message that are passed through to the matching engine 520, or the concatenation of certain fields that in most cases are unique. Any one of the one or more fields of a FIX message format, for example, may be used so long as they may be used to uniquely identify the order message.

Since on many electronic trading venues there are a plurality of matching engine components across which the instruments (such as a financial instrument encoded in an order message) that trade on the exchange are divided, the network layer data capture device 310 may perform a routing function based on the instrument referenced in the order message. In these examples, the network layer data capture device 310 may maintain a mapping of instrument to IP address and port of the relevant matching engine 520 to send the identifier and network-level timestamp.

It should be noted that in-band propagation of the network timestamp or other network layer data from the network switch 110 may be used. It should be further noted that the matching engine 520 may also obtain a network timestamp that indicates when a message is transmitted from the network switch 110.

Figure 6:
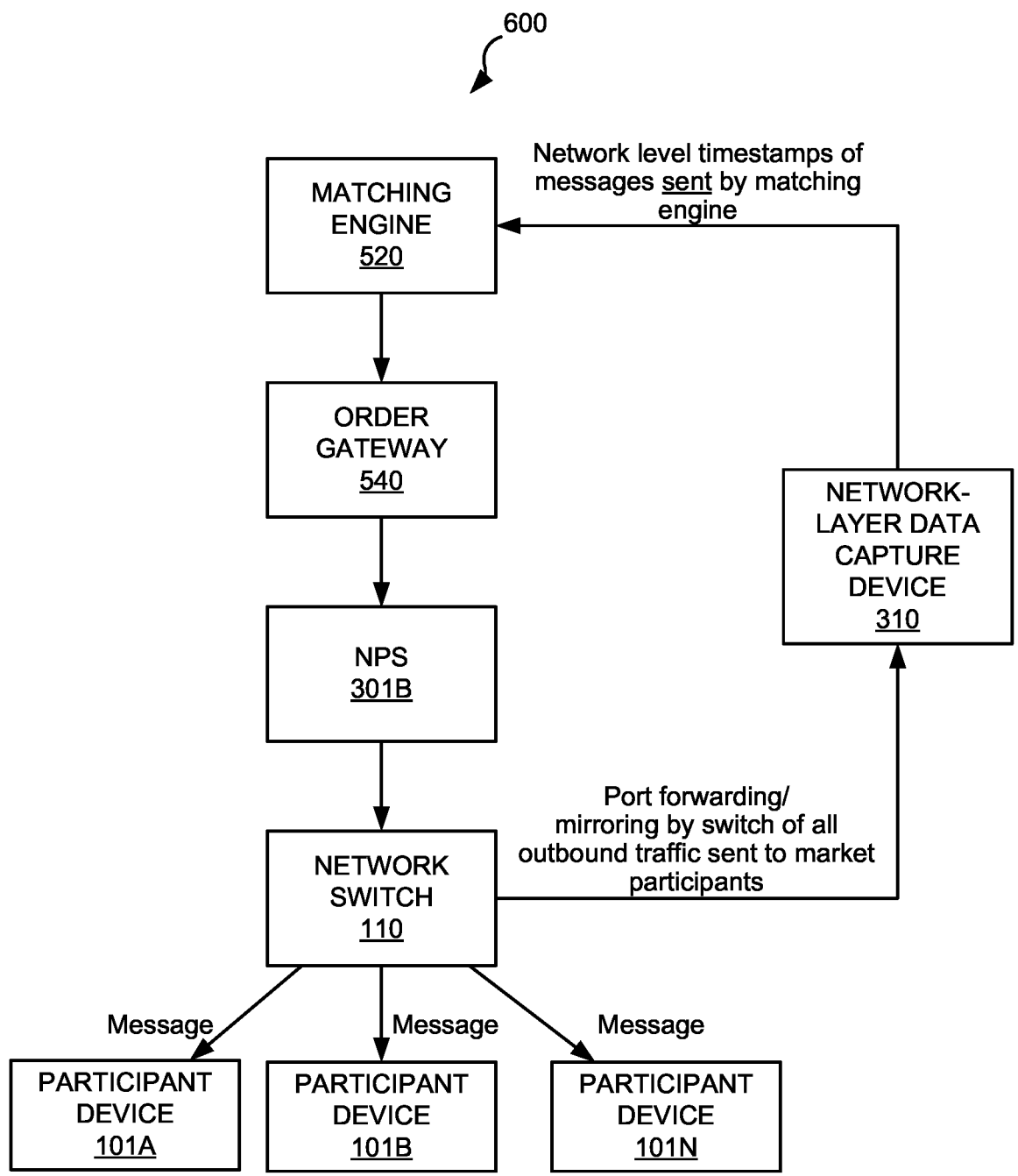
FIG. 6 illustrates a schematic flow diagram of determining, via the network layer capture device, a time at which outbound data in an electronic trading venue is transmitted by the network switch.

For example, FIG. 6 illustrates a schematic flow diagram 600 of determining, via the network layer data capture device 310, a time at which outbound data in an electronic trading venue is transmitted by the network switch 110. In various contexts, it may be advantageous to obtain network layer data such as timestamps when outbound data was transmitted. For example, in electronic trading venues, outbound data may include FIX messages that include offers for trades (such as, among others, offer-to-deal and execution reports) for which a time at which the FIX messages were actually transmitted from a network switch of the electronic trading venue. In particular, on foreign exchange trading venues where 'last look' is a common feature, many venues have implemented rules that require the liquidity provider to respond to an offer-to-deal message within a predefined time limit such as 70 milliseconds. When that time limit is exceeded the electronic trading venue itself might 'bust' or 'reject' the trade, regardless of the provider's subsequent response to an offer to deal. Network-level timestamps—particularly those at the edge of the network—may be more accurate than application-generated or other timestamps to measure provider response times under last look.

Outbound application-level messages (such as FIX messages from the matching engine 520) may be associated with network-level timestamps on an electronic trading venue. The outbound application-level messages may be encapsulated for transport through the NPS 301A or 301B via network switch 110 to a participant device 101.

In some examples, the network switch 110 may include a mirror port or forward port in which traffic, including the outbound application-level messages, is timestamped to indicate the time that the outbound application-level messages (which may have been encapsulated and transmitted as binary data) via a physical link. For example, the mirror port or forward port may transmit, to the network layer data capture device 310, an outbound application-level message and a timestamp indicating a time that the outbound application-level message was transmitted by the network switch 110. The network layer data capture device 310 may generate identifying information for the application-level message (such as a hash generated using a cryptographic hash function as described with respect to FIG. 4). The network layer data capture device 310 may transmit the identifying information and the timestamp to the matching engine 520. The matching engine 520 may have buffered the outbound application-level message, generate a hash of the outbound application-level message (which may have been buffered), and compare the generated hash with the hash received from the network layer data capture device 310. Upon finding a match between the generated hash and the received hash, the matching engine 520 may determine that a time that the outbound application-level message was transmitted at the network switch 110 based on the timestamp received from the network layer data capture device 310. In the "last look" example, the matching engine 520 may use accurate timestamps to enforce 'last look' hold times.

In some examples, instead of or addition to the mirror or forward port, the network switch 110 may include a network tap and timestamping switch for offline network packet capture. An example of such a tap and switch is described in "Quantifying the high-frequency trading 'arms race': A simple new methodology and estimates," FCA Occasional Paper by Matteo Aquilina, Eric Budish and Peter O'Neill, the content of which is incorporated by reference in its entirety herein.

Figure 7:
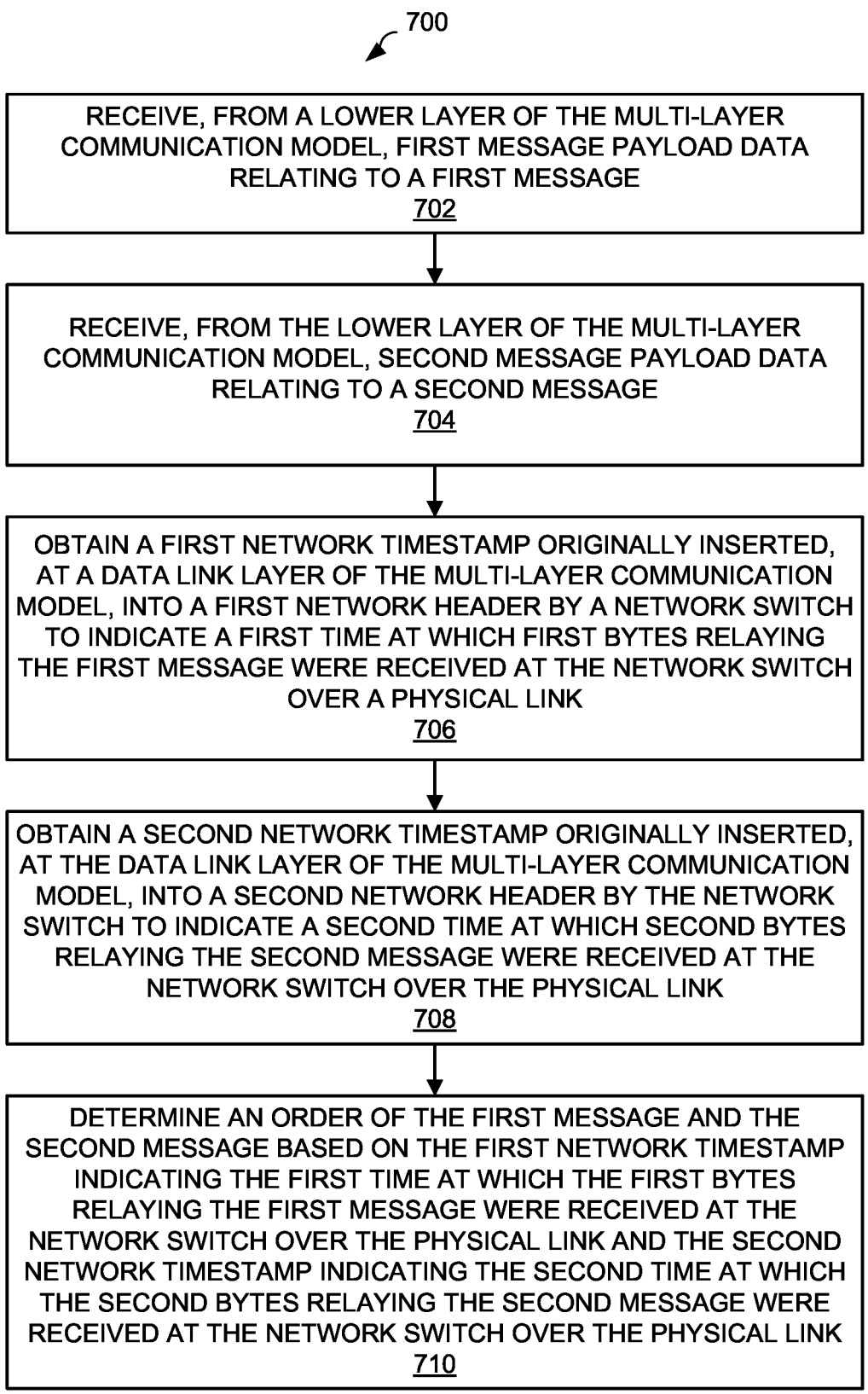
FIG. 7 illustrates an example of a method of providing network layer data to application layer components of a network protocol stack that implements a multi-layer communication model.

FIG. 7 illustrates an example of a method 700 of providing network layer data to application layer components of a network protocol stack 301A or 301B that implements a multi-layer communication model. For illustrative purposes, method 700 will be described with reference to FIG. 1 in the context of a first device (such as a participant device 101A) that transmits a first message to an application layer device (such as the application layer device 120) and a second device (such as a participant device 101B) that transmits a second message to the application layer device 120. The first and second messages may each be encapsulated for transport over a physical link of the communication network 107. The application layer device may determine an order in which the first and second messages were received at a network switch 110 that participates in decapsulation to propagate the first and second messages up to the application layer device 120. The method 700 will now be described with respect to operations of the application layer device 120.

At 702, the method 700 may include receiving, from a lower layer of the multi-layer communication model, first message payload data relating to a first message. For example, the participant device 101A may transmit the first message for delivery to the application layer device 120.

At 704, the method 700 may include receiving, from the lower layer of the multi-layer communication model, second message payload data relating to a second message. For example, the participant device 101B may transmit the second message for delivery to the application layer device 120.

At 706, the method 700 may include obtaining a first network timestamp originally inserted, at a data link layer of the multi-layer communication model, into a first network header by a network switch 110 to indicate a first time at which first bytes relaying the first message were received at the network switch 110 over a physical link. The first network header and the first network timestamp contained in the first network header were removed as the received first bytes are propagated up the multi-layer communication model from the data link layer. For example, during decapsulation, the first network header and other lower layer headers are removed.

At 708, the method 700 may include obtaining a second network timestamp originally inserted, at the data link layer of the multi-layer communication model, into a second network header by the network switch 110 to indicate a second time at which second bytes relaying the second message were received at the network switch over the physical link. The second network header and the second network timestamp contained in the second network header were removed (during decapsulation) as the received second bytes are propagated up the multi-layer communication model from the data link layer.

At 710, the method 700 may include determining an order of the first message and the second message based on the first network timestamp indicating the first time at which the first bytes relaying the first message were received at the network switch over the physical link and the second network timestamp indicating the second time at which the second bytes relaying the second message were received at the network switch over the physical link.

Figure 8:
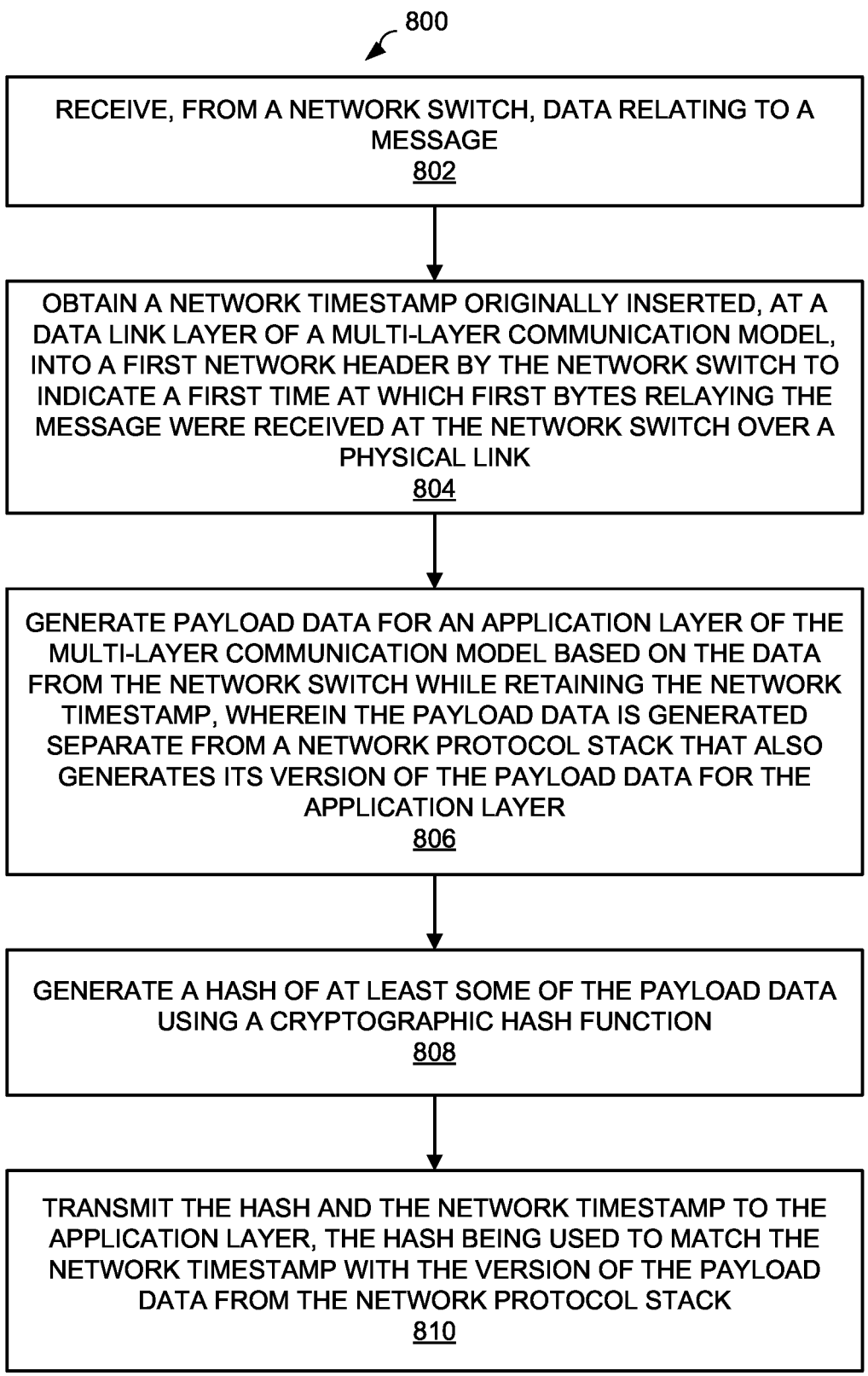
FIG. 8 illustrates an example of a method of propagation of network layer data to upper layers via a network layer capture device.

FIG. 8 illustrates an example of a method 800 of propagation of network layer data to upper layers via a network layer data capture device 310. At 802, the method 800 may include receiving, from a network switch 110, data relating to a message. At 804, the method 800 may include obtaining a network timestamp originally inserted, at a data link layer of a multi-layer communication model, into a first network header by the network switch to indicate a first time at which first bytes relaying the message were received at the network switch over a physical link, the first network header and the network timestamp contained in the first network header having been removed as the received first bytes are propagated up the multi-layer communication model from the data link layer.

At 806, the method 800 may include generating payload data for an application layer of the multi-layer communication model based on the data from the network switch while retaining the network timestamp, wherein the payload data is generated separate from a network protocol stack that also generates its version of the payload data for the application layer. At 808, the method 800 may include generating a hash of at least some of the payload data using a cryptographic hash function. At 810, the method 800 may include transmitting the hash and the network timestamp to the application layer. The hash may be used to match the network timestamp with the version of the payload data from the network protocol stack.

Figure 9:
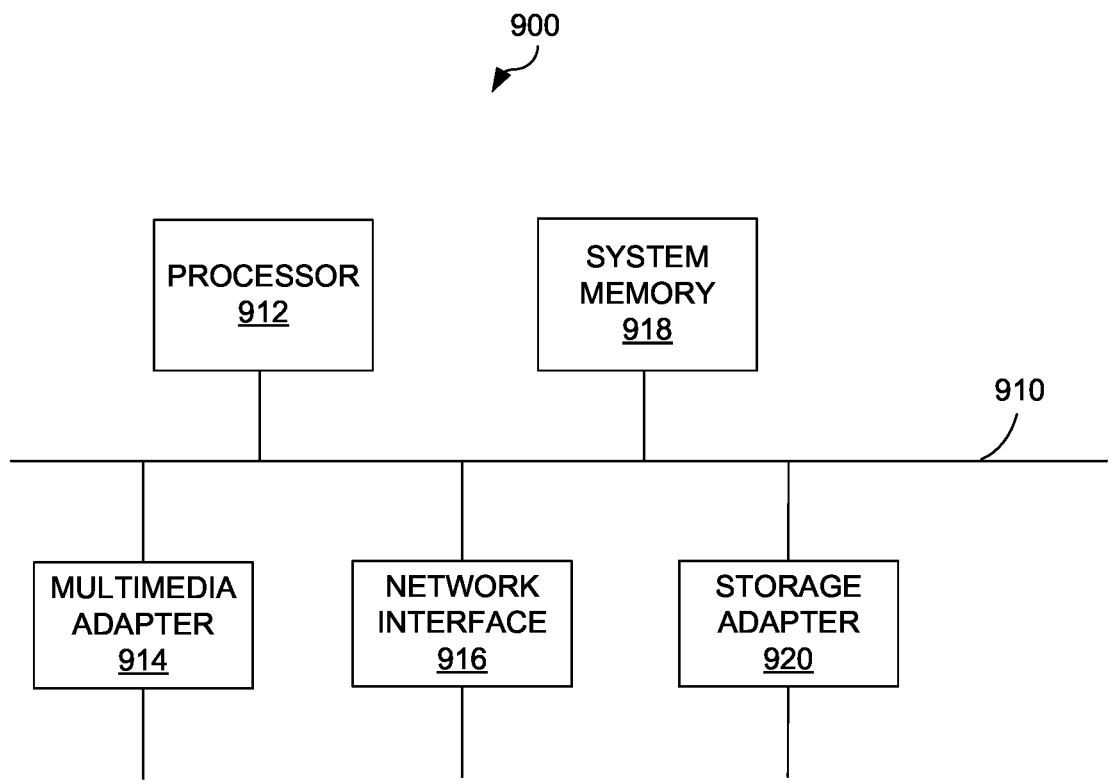
FIG. 9 illustrates an example of a computer system that may be implemented by devices illustrated in FIGS. 1, 3A, 3B, 5, and 6.

FIG. 9 illustrates an example of a computer system 900 that may be implemented by devices illustrated in FIGS. 1, 3A, 3B, 5, and 6 (such as a participant device 101, a network switch 110, an application layer device 120, a network layer data capture device 310, an NPS device 330, an NPS device 340, a device implementing the matching engine 520, an order gateway 540, and/or other devices described herein). Various ones of the devices of system environment 100 may be implemented based on some or all of the computer system 900. The computer system 900 may include, among other things, an interconnect 910, a processor 912, a multimedia adapter 914, a network interface 916, a system memory 918, and a storage adapter 920.

The interconnect 910 may interconnect various subsystems, elements, and/or components of the computer system 900. As shown, the interconnect 910 may be an abstraction that may represent any one or more separate physical buses, point-to-point connections, or both, connected by appropriate bridges, adapters, or controllers. In some examples, the interconnect 910 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 910 may allow data communication between the processor 912 and system memory 918, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 912 may control operations of the computer system 900. In some examples, the processor 912 may do so by executing instructions such as software or firmware stored in system memory 919 or other data via the storage adapter 920. In some examples, the processor 912 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 914 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 916 may provide the computer system 900 with an ability to communicate with a variety of remove devices over a network such as the communication network 111 illustrated in FIG. 1. The network interface 916 may include, for example, an Ethernet adapter, a Fibre Channel adapter, and/or other wired- or wireless-enabled adapter. The network interface 916 may provide a direct or indirect connection from one network element to another, and facilitate communication and between various network elements.

The storage adapter 920 may connect to a standard computer readable medium for storage and/or retrieval of information, such as a fixed disk drive (internal or external).

Other devices, components, elements, or subsystems (not illustrated) may be connected in a similar manner to the interconnect 910 or via a network such as the communication network 111. The devices and subsystems can be interconnected in different ways from that shown in FIG. 9. Instructions to implement various examples and implementations described herein may be stored in computer-readable storage media such as one or more of system memory 919 or other storage. Instructions to implement the present disclosure may also be received via one or more interfaces and stored in memory. The operating system provided on computer system 900 may be MS-DOS®, MS-WINDOWS®, OS/2®, OS X®, IOS®, ANDROID®, UNIX®, Linux®, or another operating system.

The various components illustrated in the Figures may be coupled to at least one other component via a network (such as communication network 107), which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

For simplicity and illustrative purposes, the disclosure included descriptions that may refer to examples. In the description, numerous specific details have been set forth in order to provide a thorough understanding of the present disclosure. It will be readily apparent however, that the disclosure may be practiced without limitation to these specific details. In other instances, some methods and structures have not been described in detail so as not to unnecessarily obscure the present disclosure.

Throughout the disclosure, the term "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A system of providing network layer data to application layer components of a network protocol stack that implements a multi-layer communication model, the system comprising:
    an application layer device that executes on an application layer of the multi-layer communication model, the application layer device comprising a hardware processor programmed with one or more instructions to:
    receive, from a lower layer of the multi-layer communication model, first message payload data relating to a first message;
    receive, from the lower layer of the multi-layer communication model, second message payload data relating to a second message;
    obtain a first network timestamp originally inserted, at a data link layer of the multi-layer communication model, into a first network header by a network switch to indicate a first time at which first bytes relaying the first message were received at the network switch over a physical link,
    the first network header and the first network timestamp having been removed as the received first bytes are propagated up the multi-layer communication model from the data link layer;
    obtain a second network timestamp originally inserted, at the data link layer of the multi-layer communication model, into a second network header by the network switch to indicate a second time at which second bytes relaying the second message were received at the network switch over the physical link,
    the second network header and the second network timestamp having been removed as the received second bytes are propagated up the multi-layer communication model from the data link layer; and
    determine an order of the first message and the second message based on the first network timestamp indicating the first time at which the first bytes relaying the first message were received at the network switch over the physical link and the second network timestamp indicating second time at which the second bytes relaying the second message were received at the network switch over the physical link.

2. The system of claim 1, wherein the first network timestamp is propagated up the multi-layer communication model from the data link layer via in-band propagation, and wherein the application layer device is further programmed to:
    receive first metadata comprising a first byte offset and the first network timestamp;
    determine, based on the first byte offset, that the first network timestamp refers to the first message payload data; and determine, based on the first network timestamp, the first time at which the first bytes were received at the network switch based on the first network timestamp.

3. The system of claim 2, further comprising the network switch, the network switch programmed to:
receive the first bytes from the physical link;
generate the first network timestamp for the first bytes; and
generate next-layer metadata for an upper layer in the multi-layer communication model, the next-layer metadata comprising the first network timestamp and a next-layer bit offset that refers to next-layer payload to which the first network timestamp refers; and
transmit the next-layer metadata and the next-layer payload to the upper layer.

4. The system of claim 2, further comprising a network protocol stack device implementing at least one layer, other than the application layer, of the multi-layer communication model, the network protocol stack device programmed to:
receive payload data intended for the at least one layer;
receive metadata propagated from a lower layer, the metadata comprising the first network timestamp and a lower-layer bit offset;
update the lower-layer bit offset to refer to some or all of the first bytes that are packaged for an upper layer; and
transmit second next-layer metadata with the updated bit offset to a second upper layer.

5. The system of claim 2, wherein the first metadata further comprises a second byte offset, and wherein the application layer device is further programmed to:
determine, based on the second byte offset, that the first network timestamp refers to a third message payload data that, together with the first message payload data, forms the first message.

6. The system of claim 1, wherein the first network timestamp is propagated up the multi-layer communication model from the data link layer via out-of-band propagation, and wherein the application layer device is further programmed to:
buffer the first message payload data and the second message payload data;
receive, from a network layer data capture device that re-implements the network protocol stack, a hash and the first network timestamp, the hash being generated by the network layer data capture device using a cryptographic hashing function;
generate a comparison hash based on the buffered first message payload data and the cryptographic hashing function;
determine a match between the received hash with the comparison hash; and
determine that the first network timestamp refers to the first message payload data based on the match.

7. The system of claim 1, wherein the application layer device is further programmed to execute a matching engine for an electronic trading venue, the first message relates to a first order, the second message relates to a second order, and wherein the application layer device is further programmed to:
generate an execution order of the first order and the second order based on the order of the first message and the second message.

8. The system of claim 7, wherein the application layer device is further programmed to:
generate data to be propagated down to and transmitted via the network switch;

receive, from a network layer capture device, a transmission timestamp indicating a time at which data from the application layer was transmitted by the network switch; and
match the data with the transmission timestamp.

9. A method of providing network layer data to application layer components of a network protocol stack that implements a multi-layer communication model, the method comprising:
receiving, by a processor executing a process on an application layer, from a lower layer of the multi-layer communication model, first message payload data relating to a first message;
receiving, by the processor, from the lower layer of the multi-layer communication model, second message payload data relating to a second message;
obtaining, by the processor, a first network timestamp originally inserted, at a data link layer of the multi-layer communication model, into a first network header by a network switch to indicate a first time at which first bytes relaying the first message were received at the network switch over a physical link,
the first network header and the first network timestamp having been removed as the received first bytes are propagated up the multi-layer communication model from the data link layer;
obtaining, by the processor, a second network timestamp originally inserted, at the data link layer of the multi-layer communication model, into a second network header by the network switch to indicate a second time at which second bytes relaying the second message were received at the network switch over the physical link,
the second network header and the second network timestamp contained in the second network header having been removed as the received second bytes are propagated up the multi-layer communication model from the data link layer; and
determining, by the processor, an order of the first message and the second message based on the first network timestamp indicating the first time at which the first bytes relaying the first message were received at the network switch over the physical link and the second network timestamp indicating the second time at which the second bytes relaying the second message were received at the network switch over the physical link.

10. The method of claim 9, wherein the first network timestamp is propagated up the multi-layer communication model from the data link layer via in-band propagation, and wherein the method further comprising:
receiving, by the processor, first metadata comprising a first byte offset and the first network timestamp;
determining, by the processor, based on the first byte offset, that the first network timestamp refers to the first message payload data; and
determining, by the processor, based on the first network timestamp, the first time at which the first bytes were received at the network switch based on the first network timestamp.

11. The method of claim 10, further comprising:
receiving, by the network switch, the first bytes from the physical link;
generating, by the network switch, the first network timestamp for the first bytes; and
generating, by the network switch, next-layer metadata for an upper layer in the multi-layer communication model, the next-layer metadata comprising the first network timestamp and a next-layer bit offset that refers to next-layer payload to which the first network timestamp refers; and transmitting, by the network switch, the next-layer metadata and the next-layer payload to the upper layer.

12. The method of claim 10, further comprising:

a network protocol stack device implementing at least one layer, other than the application layer, of the multi-layer communication model, the network protocol stack device programmed to:

receiving, by a network protocol stack device implementing at least one layer, other than the application layer, of the multi-layer communication model, payload data intended for the at least one layer;

receiving, by the network protocol stack device, metadata propagated from a lower layer, the metadata comprising the first network timestamp and a lower-layer bit offset;

updating, by the network protocol stack device, the lower-layer bit offset to refer to some or all of the first bytes that are packaged for an upper layer; and transmitting, by the network protocol stack device, second next-layer metadata with the updated bit offset to a second upper layer.

13. The method of claim 10, wherein the first metadata further comprises a second byte offset, and wherein the method further comprising:

determining, by the processor, based on the second byte offset, that the first network timestamp refers to a third message payload data that, together with the first message payload data, forms the first message.

14. The method of claim 9, wherein the first network timestamp is propagated up the multi-layer communication model from the data link layer via out-of-band propagation, and wherein the method further comprising:

buffering, by the processor, the first message payload data and the second message payload data;

receiving, by the processor, from a network layer data capture device that re-implements the network protocol stack, a hash and the first network timestamp, the hash being generated by the network layer data capture device using a cryptographic hashing function;

generating, by the processor, a comparison hash based on the buffered first message payload data and the cryptographic hashing function;

determining, by the processor, a match between the received hash with the comparison hash; and determining, by the processor, that the first network timestamp refers to the first message payload data based on the match.

15. The method of claim 9, wherein the first message relates to a first order, the second message relates to a second order, and wherein the method further comprising:

generating, by the processor, an execution order of the first order and the second order based on the order of the first message and the second message.

16. The method of claim 15, wherein the method further comprising:

generating, by the processor, data to be propagated down to and transmitted via the network switch;

receiving, by the processor, from a network layer capture device, a transmission timestamp indicating a time at which data from the application layer was transmitted by the network switch; and matching, by the processor, the data with the transmission timestamp.

17. A network layer capture device, comprising a hardware processor programmed with one or more instructions to:

receive, from a network switch, data relating to a message;

obtain a network timestamp originally inserted, at a data link layer of a multi-layer communication model, into a first network header by the network switch to indicate a first time at which first bytes relaying the message were received at the network switch over a physical link, the first network header and the network timestamp having been removed as the received first bytes are propagated up the multi-layer communication model from the data link layer;

generate payload data for an application layer of the multi-layer communication model based on the data from the network switch while retaining the network timestamp, wherein the payload data is generated separate from a network protocol stack that also generates its version of the payload data for the application layer;

generate a hash of at least some of the payload data using a cryptographic hash function; and transmit the hash and the network timestamp to the application layer, the hash being used to match the network timestamp with the version of the payload data from the network protocol stack.

18. The network layer capture device of claim 17, wherein to generate the payload data, the processor is further programmed to:

re-implement one or more layers of the network protocol stack to propagate the network timestamp, the re-implementation modifying one or more layers of the network protocol stack to propagate the network timestamp.

19. The network layer capture device of claim 17, wherein to re-implement one more or layers implemented by the network protocol stack, the processor is further programmed to emulate one or more devices that implement at least one layer of the network protocol stack to:

receive payload data intended for the at least one layer;

receive metadata propagated from a lower layer, the metadata comprising the network timestamp and a lower-layer bit offset;

update the lower-layer bit offset to refer to some or all of the first bytes that are packaged for an upper layer; and transmit second next-layer metadata with the updated bit offset to a second upper layer.

20. The network layer capture device of claim 17, wherein the processor is further programmed to:

receive, from the network switch, a transmission timestamp indicating a time at which data from the application layer was transmitted by the network switch; and provide the transmission timestamp to the application layer.

* * * * *